(12) United States Patent
Niitani et al.

(10) Patent No.: US 9,217,052 B2
(45) Date of Patent: Dec. 22, 2015

(54) COPOLYMER

(75) Inventors: Takeshi Niitani, Ichihara (JP); Gou Mishima, Ichihara (JP); Yuichi Tateishi, Ichihara (JP); Toshiaki Okado, Ichihara (JP); Hidenori Naruse, Tokyo (JP); Tooru Kajita, Tokyo (JP)

(73) Assignee: NIPPON SODA CO., LTD., Tokyo (JP)

( * ) Notice: Subject to any disclaimer, the term of this patent is extended or adjusted under 35 U.S.C. 154(b) by 43 days.

(21) Appl. No.: 13/703,449

(22) PCT Filed: Jun. 28, 2011

(86) PCT No.: PCT/JP2011/003672
§ 371 (c)(1),
(2), (4) Date: Dec. 11, 2012

(87) PCT Pub. No.: WO2012/001945
PCT Pub. Date: Jan. 5, 2012

(65) Prior Publication Data
US 2013/0085233 A1    Apr. 4, 2013

(30) Foreign Application Priority Data

Jun. 30, 2010   (JP) ................................ 2010-148859

(51) Int. Cl.
*C09D 11/326* (2014.01)
*C09D 11/106* (2014.01)
*C09D 11/107* (2014.01)
*C08F 265/06* (2006.01)
*C08F 297/02* (2006.01)

(52) U.S. Cl.
CPC ........... *C08F 265/06* (2013.01); *C08F 297/026* (2013.01); *C09D 11/106* (2013.01); *C09D 11/107* (2013.01); *C09D 11/326* (2013.01)

(58) Field of Classification Search
CPC .... C08F 297/026; C08F 265/06; C08F 26/00; C08D 11/326; C08D 11/106; C08D 11/107
See application file for complete search history.

(56) References Cited

U.S. PATENT DOCUMENTS

| | | | |
|---|---|---|---|
| 5,272,201 A | 12/1993 | Ma et al. | |
| 2005/0004280 A1* | 1/2005 | Takizuka et al. | 524/115 |
| 2010/0143590 A1* | 6/2010 | Held et al. | 427/256 |

FOREIGN PATENT DOCUMENTS

| | | |
|---|---|---|
| EP | 2 330 154 A1 | 6/2011 |
| JP | B2-61-6866 | 3/1986 |
| JP | A-1-229014 | 9/1989 |
| JP | A-4-62880 | 2/1992 |
| JP | A-5-295305 | 11/1993 |
| JP | A-6-289609 | 10/1994 |
| JP | A-2001-279164 | 10/2001 |
| JP | A-2003-64139 | 3/2003 |
| JP | A-2007-84659 | 4/2007 |
| JP | A-2010-134419 | 6/2010 |
| WO | WO 2008/156148 A1 | 12/2008 |
| WO | WO 2010/013651 A1 | 2/2010 |
| WO | WO 2010068216 A1 * | 6/2010 |

OTHER PUBLICATIONS

International Search Report issued in International Patent Application No. PCT/JP2011/003672 mailed Sep. 20, 2011.
International Prelminary Report on Patentability issued in International Patent Application No. PCT/JP2011/003672 issued Feb. 12, 2013.
Jun. 25, 2014 Search Report issued in European Patent Application No. 11800415.9.

* cited by examiner

*Primary Examiner* — Mark Kaucher
(74) *Attorney, Agent, or Firm* — Oliff PLC

(57) ABSTRACT

An object of the present invention is to provide a novel copolymer useful as a dispersing agent for a pigment or the like. The novel copolymer contains: a block chain (A) comprising at least one repeating unit selected from the group consisting of a repeating unit having a tertiary amino group and a repeating unit having a quaternary ammonium salt group; and a block chain (B) comprising a repeating unit having an acidic group and a repeating unit represented by the following formula (I) (wherein $R^1$ represents a hydrogen atom or a C1-C3 alkyl group; and $R^2$ represents an aliphatic hydrocarbon group or an alicyclic hydrocarbon group), wherein the repeating unit represented by formula (I) has a copolymerization ratio of 90 mass % or more in the block chain (B).

1 Claim, No Drawings

COPOLYMER

TECHNICAL FIELD

The present invention relates to a novel copolymer useful as a dispersing agent. The present application claims the benefit of priority from Japanese Patent Application No. 2010-148859, filed on Jun. 30, 2010, the contents of which are incorporated herein by reference.

BACKGROUND ART

Copolymer-type pigment dispersing agents have been developed in a variety of fields.

Pigment dispersing agents that improve, for example, the dispersibility, fluidity, storage stability, post-drying redissolution properties and substrate adhesion of pigments for ink, particularly, carbon black, have been developed. Patent Document 1 discloses a pigment composition comprising a pigment, an organic dye derivative containing an acidic functional group, an alkali-soluble resin and an organic solvent, wherein the alkali-soluble resin having an amino group and/or a quaternary ammonium group thereof has a basic equivalent of 3000 to 20000 g/eq and an acid number of 30 to 200 mgKOH/g. Specifically, the document describes a random copolymer of n-butyl methacrylate, methyl methacrylate, methacrylic acid and dimethylaminoethyl methacrylate, or the like as the alkali-soluble resin.

Since the random copolymer of n-butyl methacrylate, methyl methacrylate, methacrylic acid and dimethylaminoethyl methacrylate has various properties based on their specific structures, their development has been studied in various fields.

Patent Documents 2 and 3 focus on the amphoteric polymer properties of the random copolymer of getting positively or negatively charged by acid or base treatment, and utilize the random copolymer as an electrophoretic composition.

Alternatively, Patent Document 4 focuses on the reactivity of carboxyl and amino groups in the random copolymer and utilizes the random copolymer as a binder for silyl isocyanate.

Alternatively, Patent Document 5 discloses that the random copolymer is utilized as a powder paint composition, wherein the carboxyl group of the random copolymer is cross-linked with an epoxy group with the amino group of the random copolymer as a catalyst.

PRIOR ART DOCUMENTS

Patent Documents

Patent Document 1: Japanese unexamined Patent Application Publication No. 2007-84659
Patent Document 2: Japanese unexamined Patent Application Publication No. 6-289609
Patent Document 3: Japanese unexamined Patent Application Publication No. 5-295305
Patent Document 4: Japanese unexamined Patent Application Publication No. 4-62880
Patent Document 5: Japanese unexamined Patent Application Publication No. 61-6866

SUMMARY OF THE INVENTION

Object to be Solved by the Invention

In recent years, in accordance with diversification of use of dispersing agents, a copolymer to be used as a dispersing agent has been required to have various characteristics.

For example, in the field of color liquid crystal displays, because of increasing demands for higher visible light transmittance and higher contrast, pigment particles are made further finer at least to a wavelength of visible light or smaller. In such fine particles, a specific surface area of the pigment particles is larger than that of general particles, and therefore, a copolymer conventionally used for a pigment dispersing agent has such problems that pigment dispersibility attained at an initial stage and dispersion stability attained over time are insufficient. Furthermore, although higher performances have recently been required in addition to the dispersion performance, conventional copolymers have a problem in which sufficient performances may not be attained.

Means to Solve the Object

The present inventors have earnestly studied for overcoming the aforementioned problems, resulting in finding that the problems may be overcome by using a novel copolymer comprising a block chain comprising at least one repeating unit selected from the group consisting of a repeating unit having a tertiary amino group and a repeating unit having a quaternary ammonium salt group; and a block chain comprising a repeating unit having an acidic group and a repeating unit represented by formula (I), and thus, the present invention has been achieved.

Specifically, the present invention relates to:

(1) a copolymer comprising a block chain (A) comprising at least one repeating unit selected from the group consisting of a repeating unit having a tertiary amino group and a repeating unit having a quaternary ammonium salt group; and a block chain (B) comprising a repeating unit having an acidic group and a repeating unit represented by formula (I):

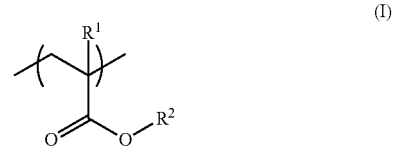

(I)

(wherein $R^1$ represents a hydrogen atom or a C1-C3 alkyl group; and $R^2$ represents an aliphatic hydrocarbon group or an alicyclic hydrocarbon group), wherein the repeating unit represented by formula (I) has a copolymerization ratio of 90 mass % or more in the block chain (B);

(2) the copolymer according to (1), wherein the at least one repeating unit selected from the group consisting of a repeating unit having a tertiary amino group and a repeating unit having a quaternary ammonium salt group is a repeating unit represented by formula (II):

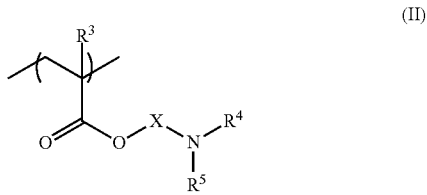

(II)

(wherein $R^3$ represents a hydrogen atom or a C1-C3 alkyl group, $R^4$ and $R^5$ each independently represent a C1-C6 alkyl group or a C6-C10 aryl C1-C6 alkyl group, and X represents a C1-C10 alkylene group or a C1-C10 alkylene-O—C1-C10 alkylene group); and (3) the copolymer according to (1) or (2), wherein the repeating unit having an acidic group is a repeating unit represented by formula (III):

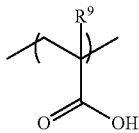

(III)

(wherein $R^9$ represents a hydrogen atom or a C1-C3 alkyl group), or a repeating unit represented by formula (IV):

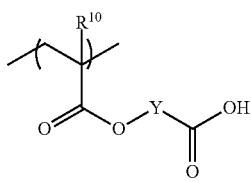

(IV)

wherein $R^{10}$ represents a hydrogen atom or a C1-C3 alkyl group, and Y represents a C1-C10 alkylene group or a C1-C10 alkylene-O—C1-C10 alkylene group.

MODE OF CARRYING OUT THE INVENTION (1) Copolymer

A copolymer of the present invention contains at least one block chain (A) and at least one block chain (B) described below.

Block chain (A): a block chain comprising at least one repeating unit selected from the group consisting of a repeating unit having a tertiary amino group and a repeating unit having a quaternary ammonium salt group.

Block chain (B): a block chain comprising a repeating unit having an acidic group and a repeating unit represented by formula (I).

Furthermore, the copolymer of the present invention may contain another block chain in addition to the block chain (A) and the block chain (B).

1) Block Chain (A)

In the block chain (A), the repeating unit having a tertiary amino group and the repeating unit having a quaternary ammonium salt group are not particularly limited as far as they have such a cationic functional group on a side chain thereof.

Specifically, the block chain (A) includes a block chain consisting of merely one repeating unit having a tertiary amino group or a repeating unit having a quaternary ammonium salt group, a block chain consisting of two or more repeating units having a tertiary amino group or repeating units having a quaternary ammonium salt group, a block chain consisting of at least one repeating unit having a tertiary amino group and at least one repeating unit having a quaternary ammonium salt group, and a block chain of any of these polymers and another repeating unit derived from a copolymerizable monomer. Repeating units in the block chain (A) may be bound with each other in any of random, alternating and block patterns and the like.

(Repeating Unit Having Tertiary Amino Group)

The repeating unit having a tertiary amino group is not particularly limited as far as it has a tertiary amino group, and an example is a repeating unit represented by the following general formula (V):

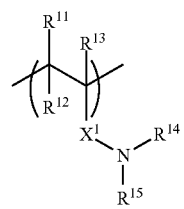

(V)

In formula (V), $R^{11}$, $R^{12}$ and $R^{13}$ each independently represent a hydrogen atom or a C1-C3 alkyl group. $X^1$ represents a group selected from the group consisting of a C1-C10 alkylene group, —COOR$^{16}$—, —CONHR$^{16}$—, —OCOR$^{16}$— and —R$^{17}$—OCO—R$^{16}$— (wherein $R^{16}$ and $R^{17}$ each independently represent a C1-C10 alkylene group or a C1-C10 alkylene-O—C1-C10 alkylene group). $R^{14}$ and $R^{15}$ each independently represent a C1-C6 alkyl group or a C6-C10 aryl C1-C6 alkyl group.

Among these, a repeating unit represented by the following formula (II) is preferred:

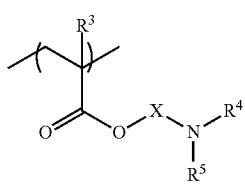

(II)

In formula (II), $R^3$ represents a hydrogen atom or a C1-C3 alkyl group, $R^4$ and $R^5$ each independently represent a C1-C6 alkyl group or a C6-C10 aryl C1-C6 alkyl group, and X represents a C1-C10 alkylene group or a C1-C10 alkylene-O—C1-C10 alkylene group.)

Here, examples of the C1-C3 alkyl group and the C1-C6 alkyl group include methyl, ethyl, n-propyl, i-propyl, n-butyl, s-butyl, i-butyl, t-butyl, n-pentyl and n-hexyl.

Examples of the C1-C10 alkylene group include a methylene chain, an ethylene chain, a propylene chain, a methyl ethylene chain, a butylene chain, a 1,2-dimethylethylene chain, a pentylene chain, a 1-methylbutylene chain, a 2-methylbutylene chain and a hexylene chain.

Examples of the C6-C10 aryl C1-C6 alkyl group include benzyl, phenethyl, 3-phenyl-n-propyl, 1-phenyl-n-hexyl, naphthalen-1-ylmethyl, naphthalen-2-ylethyl, 1-naphthalen-2-yl-n-propyl and inden-1-ylmethyl.

Examples of a monomer usable as a material for the repeating unit represented by formula (V) or formula (II) include dimethylaminoethyl (meth)acrylate, dimethylaminopropyl (meth)acrylate, dimethylaminobutyl (meth)acrylate, Diethylaminoethyl (meth)acrylate, diethylaminopropyl (meth)acrylate, and diethylaminobutyl (meth)acrylate.

(Repeating Unit Having Quaternary Ammonium Salt Group)

The repeating unit having a quaternary ammonium salt group is not particularly limited as far as it has a quaternary ammonium salt group, and an example is a repeating unit represented by the following general formula (VI):

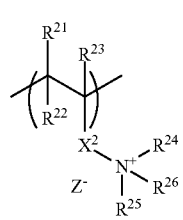

(VI)

In formula (VI), $R^{21}$, $R^{22}$ and $R^{23}$ each independently represent a hydrogen atom or a C1-C3 alkyl group. $X^2$ represents a group selected from the group consisting of a C1-C10 alkylene group, —$COOR^{27}$—$CONHR^{27}$—, —$OCOR^{27}$— and —$R^{28}$—$OCO$—$R^{27}$— (wherein $R^{27}$ and $R^{28}$ each independently represent a C1-C10 alkylene group or a C1-C10 alkylene-O—C1-C10 alkyl group). $R^{24}$, $R^{25}$ and $R^{26}$ each independently represent a C1-C6 alkyl group or a C6-C10 aryl C1-C6 alkyl group. $Z^-$ represents a counter ion such as a halide ion, an alkyl halide ion, an alkyl carboxylate ion, a nitroxide ion, an alkyl sulfate ion, a sulfonate ion, a phosphate ion or an alkyl phosphate ion.

Here, examples of the C1-C3 alkyl group, the C1-C6 alkyl group, the C1-C10 alkylene group and the C6-C10 aryl C1-C6 alkyl group are the same as those described above with respect to formula (V) representing the repeating unit having a tertiary amino group.

Among these, a repeating unit represented by formula (VII) is preferred.

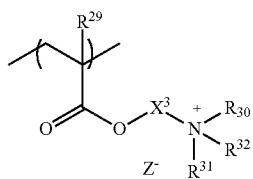

(VII)

In formula (VII), $R^{29}$ represents a hydrogen atom or a C1-C3 alkyl group. $X^3$ represents a C1-C10 alkylene group or a C1-C10 alkylene-O—C1-C10 alkylene group. $R^{30}$, $R^{31}$ and $R^{32}$ each independently represent a C1-C6 alkyl group or a C6-C10 aryl C1-C6 alkyl group. $Z^-$ represents a counter ion.)

Here, examples of the C1-C3 alkyl group, the C1-C6 alkyl group, the C1-C10 alkylene group and the C6-C10 aryl C1-C6 alkyl group are the same as those described above with respect to formula (V) representing the repeating unit having a tertiary amino group.

Examples of a monomer usable as a material for the repeating unit represented by formula (VI) or formula (VII) include (meth)acryloyloxyethyltrimethyl ammonium fluoride, (meth)acryloyloxyethyltrimethyl ammonium chloride, (meth)acryloyloxyethyltrimethyl ammonium bromide, (meth)acryloyloxyethyltrimethyl ammonium iodide, (meth)acryloyloxypropyltrimethyl ammonium fluoride, (meth)acryloyloxypropyltrimethyl ammonium chloride, (meth)acryloyloxypropyltrimethyl ammonium bromide, (meth)acryloyloxypropyltrimethyl ammonium iodide, (meth)acryloyloxybutyltrimethyl ammonium fluoride, (meth)acryloyloxybutyltrimethyl ammonium chloride, (meth)acryloyloxybutyltrimethyl ammonium bromide, (meth)acryloyloxybutyltrimethyl ammonium iodide, (meth)acryloyloxyethylbenzyldimethyl ammonium fluoride, (meth)acryloyloxyethylbenzyldimethyl ammonium chloride, (meth)acryloyloxyethylbenzyldimethyl ammonium bromide, (meth)acryloyloxyethylbenzyldimethyl ammonium iodide, (meth)acryloyloxypropylbenzyldimethyl ammonium fluoride, (meth)acryloyloxypropylbenzyldimethyl ammonium chloride, (meth)acryloyloxypropylbenzyldimethyl ammonium bromide, (meth)acryloyloxypropylbenzyldimethyl ammonium iodide, (meth)acryloyloxybutylbenzyldimethyl ammonium fluoride, (meth)acryloyloxybutylbenzyldimethyl ammonium chloride, (meth)acryloyloxybutylbenzyldimethyl ammonium bromide and (meth)acryloyloxybutylbenzyldimethyl ammonium iodide.

(Another Repeating Unit that can be Contained)

Examples of another repeating unit that can be contained in the block chain (A) include repeating units derived from a (meth)acrylic acid-based monomer, an aromatic vinyl-based monomer, a conjugated diene-based monomer or the like.

Examples of the (meth)acrylic acid-based monomer, the aromatic vinyl-based monomer or the conjugated diene-based monomer usable as a material for the repeating unit are as follows.

Examples of the (meth)acrylic acid-based monomer include (meth)acrylic acid; (meth)acrylic acid ester compounds such as methyl (meth)acrylate, ethyl (meth)acrylate, n-propyl (meth)acrylate, i-propyl (meth)acrylate, n-butyl (meth)acrylate, i-butyl (meth)acrylate, s-butyl( meth)acrylate, t-butyl (meth)acrylate, Hexyl (meth)acrylate, cyclohexyl (meth)acrylate, 2-ethylhexyl (meth)acrylate, 1-ethylcyclohexyl (meth)acrylate and benzyl (meth)acrylate; 2-methoxyethyl (meth)acrylate, methoxypolyethylene glycol (in which the number of ethylene glycol units is 2 to 100) (meth)acrylate, ethoxypolyethylene glycol (meth)acrylate, and phenoxypolyethylene glycol (meth)acrylate, and these monomers may be singly used or a mixture of two or more of them may be used.

Examples of the aromatic vinyl-based monomer include styrene, o-methylstyrene, p-methylstyrene, p-t-butylstyrene, α-methylstyrene, p-t-butoxystyrene, m-t-butoxystyrene, p-(1-ethoxyethoxy)styrene, 2,4-dimethylstyrene, vinyl aniline, vinylbenzoic acid, vinylnaphthalene, vinylanthracene, heteroaryl compounds such as 2-vinylpyridine, 4-vinylpyridine, 2-vinylquinoline, 4-vinylquinoline, 2-vinylthiophene, and 4-vinylthiophene, and these monomers may be singly used or a mixture of two or more of them may be used.

Examples of the conjugated diene-based monomer include 1,3-butadiene, isoprene, 2-ethyl-1,3-butadiene, 2-t-butyl-1,3-butadiene, 2-phenyl-1,3-butadiene, 2,3-dimethyl-1,3-butadiene, 1,3-pentadiene, 2-methyl-1,3-pentadiene, 3-methyl-1,3-pentadiene, 1,3-hexadiene, 2-methyl-1,3-octadiene, 4,5-diethyl-1,3-octadiene, 3-butyl-1,3-octadiene, 1,3-cyclopentadiene, 1,3-cyclohexadiene, 1,3-cyclooctadiene, 1,3-tricyclodecadiene, myrcene, and chloroprene, and these monomers may be singly used or a mixture of two or more of them may be used.

2) Block Chain (B)

The block chain (B) is a block chain comprising at least one repeating unit having an acidic chain and at least one repeating unit represented by formula (I).

The copolymerization ratio of at least one repeating unit represented by formula (I) in the block chain (B) is 90 mass % or more, preferably 91 mass % to 99 mass %.

The block chain (B) may be in any of random, alternating and block forms and the like.

(Repeating Unit Having Acidic Group)

The repeating unit having an acidic group included in the block chain (B) is not particularly limited as far as it has an acidic group such as —OH, —COOH, —SO$_3$H, —SO$_2$NH$_2$ or —C(CF$_3$)$_2$—OH, and an example is a repeating unit represented by formula (VIII):

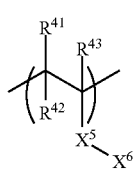
(VIII)

In formula (VIII), $R^{41}$ $R^{42}$ and $R^{43}$ each independently represent a hydrogen atom or a C1-C3 alkyl group. $X^5$ represents a single bond or a group selected from the group consisting of a C1-C10 alkylene group, —COOR$^{44}$—, —CONHR$^{44}$—, —OCOR$^{44}$— and —R$^{45}$—OCO—R$^{44}$— (wherein R$^{44}$ and R$^{45}$ each independently represent a C1-C10 alkylene group or a C1-C10 alkylene-O—C1-C10 alkylene group. $X^6$ represents an acidic group such as —OH, —COOH, —SO$_3$H, —SO$_2$NH$_2$ or —C(CF$_3$)$_2$—OH.

Among the examples, a repeating unit represented by formula (III) or (IV) is preferred:

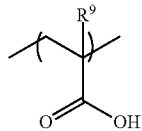
(III)

(wherein $R^9$ represents a hydrogen atom or a C1-C3 alkyl group.)

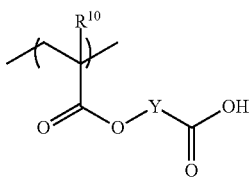
(IV)

(wherein $R^{10}$ represents a hydrogen atom or a C1-C3 alkyl group, and Y represents a C1-C10 alkylene group or a C1-C10 alkylene-O—C1-C10 alkylene group.)

Examples of a monomer usable as a material for the repeating unit represented by formula (VIII), (III) or (IV) are as follows.

Specific examples of a monomer having a carboxyl group include acrylic acid, methacrylic acid, acrylic acid carboxymethyl ester, and acrylic acid 2-carboxyethyl ester.

Examples of a monomer having a hydroxyl group as an acidic group include 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2-hydroxybutyl acrylate, 2-hydroxybutyl methacrylate, glycerol acrylate, glycerol methacrylate, ethylene glycol acrylate, ethylene glycol methacrylate, polyethylene glycol acrylate, polyethylene glycol methacrylate, propylene glycol acrylate, propylene glycol methacrylate, polypropylene glycol acrylate, polypropylene glycol methacrylate and vinyl alcohol.

Examples of a monomer having a sulfonic group as an acidic group include 2-acryloyloxyethylsulfonic acid, 2-acryloyloxyethylsulfonic acid, sodium 2-acryloyloxyethylsulfonate, lithium 2-acryloyloxyethylsulfonate, ammonium 2-acryloyloxyethylsulfonate, imidazolium 2-acryloyloxyethylsulfonate, pyridinium 2-acryloyloxyethylsulfonate, sodium 2-methacryloyloxyethylsulfonate, lithium 2-methacryloyloxyethylsulfonate, ammonium 2-methacryloyloxyethylsulfonate, imidazolium 2-methacryloyloxyethylsulfonate, pyridinium 2-methacryloyloxyethylsulfonate, styrenesulfonic acid, sodium styrenesulfonate, lithium styrenesulfonate, ammonium styrenesulfonate, imidazolium styrenesulfonate, and pyridinium styrenesulfonate.

(Repeating Unit Represented by Formula (I))

The block chain (B) further contains at least one repeating unit represented by the following formula (I):

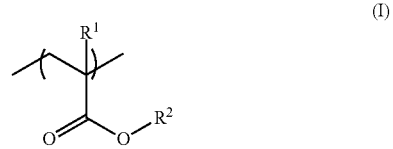
(I)

In formula (I), $R^1$ represents a hydrogen atom or a C1-C3 alkyl group; and $R^2$ represents an aliphatic hydrocarbon group or an alicyclic hydrocarbon group.

In the present invention, examples of the C1-C3 alkyl group represented by $R^1$ are the same as those described above with respect to formula (V) representing the repeating unit having a tertiary amino group.

In the present invention, the aliphatic hydrocarbon group represented by $R^2$ may be saturated or unsaturated and includes C1-C20 alkyl groups, C2-C20 alkenyl groups and C2-C20 alkynyl groups.

Examples of the C1-C20 alkyl groups include methyl, ethyl, n-propyl, isopropyl, n-butyl, isobutyl, tert-butyl, n-pentyl, isopentyl, neopentyl, tert-pentyl, 2-methylbutyl, n-hexyl, isohexyl, 3-methylpentyl, ethylbutyl, n-heptyl, 2-methylhexyl, n-octyl, isooctyl, tert-octyl, 2-ethylhexyl, 3-methylheptyl, n-nonyl, isononyl, 1-methyloctyl, ethylheptyl, n-decyl, 1-methylnonyl, n-undecyl, 1,1-dimethylnonyl, n-dodecyl, n-tetradecyl, n-heptadecyl and n-octadecyl groups. Of them, C1-C6 alkyl groups are preferable.

Examples of the C2-C20 alkenyl groups include vinyl, 1-propenyl, 2-propenyl, 1-butenyl, 2-butenyl, 3-butenyl, 1-methyl-2-propenyl, 2-methyl-2-propenyl, 1-pentenyl, 2-pentenyl, 3-pentenyl, 4-pentenyl, 1-methyl-2-butenyl, 2-methyl-2-butenyl, 1-hexenyl, 2-hexenyl, 3-hexenyl, 4-hexenyl, 5-hexenyl, heptenyl, octenyl, decenyl, pentadecenyl, eicosenyl and tricosenyl groups. Of them, C2-C6 alkenyl groups are preferable.

Examples of the C2-C20 alkynyl groups include ethynyl, 1-propynyl, 2-propynyl, 1-butynyl, 2-butynyl, 3-butynyl, 1-methyl-2-propynyl, 2-methyl-2-propynyl, 1-pentynyl, 2-pentynyl, 3-pentynyl, 4-pentynyl, 1-methyl-2-butynyl, 2-methyl-2-butynyl, 1-hexynyl, 2-hexynyl, 3-hexynyl, 4-hexynyl, 5-hexynyl, 1-heptynyl, 1-octynyl, 1-decynyl, 1-pentadecynyl, 1-eicosynyl and 1-tricosynyl groups. C2-C6 alkynyl groups are preferable.

In the present invention, the alicyclic hydrocarbon group means a saturated or unsaturated hydrocarbon group having a monocyclic or polycyclic structure at any moiety in the group and includes C3-C20 cycloalkyl groups, C4-C20 alkyl-substituted cycloalkyl groups, C4-C20 cycloalkylalkyl groups, C3-C20 cycloalkenyl groups, C4-C20 alkyl-substituted cycloalkenyl groups, C4-C20 cycloalkenylalkyl groups and C7-C20 bridged cyclic hydrocarbon groups.

Examples of the C3-C20 cycloalkyl groups include cyclopropyl, cyclobutyl, cyclopentyl, cyclohexyl, cycloheptyl and cyclooctyl.

Examples of the C4-C20 alkyl-substituted cycloalkyl groups include 1-methylcyclopropyl, 2-ethylcyclopropyl, 3-methylcyclohexyl, 4-methylcyclohexyl, 4-ethylcyclohexyl, 3-ethylcyclohexyl and 2-methylcyclooctyl.

Examples of the C3-C20 cycloalkylalkyl groups include cyclopropylmethyl, cyclobutylmethyl, cyclopentylmethyl, cyclohexylmethyl, cycloheptylethyl and cyclooctylethyl.

Examples of the C3-C20 cycloalkenyl groups include cyclopropenyl, cyclobutenyl, cyclopentenyl, cyclohexenyl, cycloheptenyl, cyclooctenyl and cyclopentadienyl.

Examples of the C4-C20 alkyl-substituted cycloalkenyl groups include 3-ethylcyclopentenyl, hexenyl-4-methylcyclohexenyl and 4-ethylcyclohexenyl.

Examples of the C4-C20 cycloalkenylalkyl groups include cyclopropenylmethyl, cyclobutenylmethyl, cyclopentenylethyl and cyclohexenylethyl.

Examples of the C7-C20 bridged cyclic hydrocarbon groups include tricyclo[$5.2.1.0^{2,6}$]decan-8-yl, adamantyl, dicyclopentenyl and isobornyl groups.

(Another Repeating Unit that can be Contained)

Examples of another repeating unit that can be contained in the block chain (B) include repeating units derived from an aromatic vinyl-based monomer or a conjugated diene-based monomer.

Examples of the aromatic vinyl-based monomer include styrene, o-methyl styrene, p-methyl styrene, p-t-butyl styrene, α-methyl styrene, p-t-butoxystyrene, m-t-butoxystyrene, p-(1-ethoxyethoxy)styrene, 2,4-dimethylstyrene, vinylaniline, vinylbenzoic acid, vinylnaphthalene, vinyl anthracene, heteroaryl compounds such as 2-vinylpyridine, 4-vinylpyridine, 2-vinylquinoline, 4-vinylquinoline, 2-vinylthiophene, and 4-vinylthiophene, and these monomers may be singly used or a mixture of two or more of them may be used.

Examples of the conjugated diene-based monomer include 1,3-butadiene, isoprene, 2-ethyl-1,3-butadiene, 2-t-butyl-1,3-butadiene, 2-phenyl-1,3-butadiene, 2,3-dimethyl-1,3-butadiene, 1,3-pentadiene, 2-methyl-1,3-pentadiene, 3-methyl-1,3-pentadiene, 1,3-hexadiene, 2-methyl-1,3-octadiene, 4,5-diethyl-1,3-octadiene, 3-butyl-1,3-octadiene, 1,3-cyclopentadiene, 1,3-cyclohexadiene, 1,3-cyclooctadiene, 1,3-tricyclodecadiene, myrcene, and chloroprene, and these monomers may be singly used or a mixture of two or more of them may be used.

3) Other Items (Block Chain that can be Contained in Copolymer in Addition to Block Chains (A) and (B))

The copolymer of the present invention may contain another block chain in addition to the block chains (A) and (B).

Examples of such a block chain include block chains containing a repeating unit derived from a (meth)acrylic acid-based monomer, an aromatic vinyl-based monomer, or a conjugated diene-based monomer. Each repeating unit may be in any of homopolymerized, random-copolymerized, alternating-copolymerized and block-copolymerized forms and the like.

Examples of the (meth)acrylic acid-based monomer, the aromatic vinyl-based monomer and the conjugated diene-based monomer are the same as those described above.

(Ratio Between Block Chains (A) and (B) in Copolymer and their Physical Properties Such as Molecular Weights)

A ratio between the block chain (A) and the block chain (B) in the copolymer of the present invention is not particularly limited, and is 10 to 40:90 to 60 and preferably 15 to 35:85 to 65 in a wt % ratio. Furthermore, a content of the repeating unit having an acidic group in the copolymer is 0.5 to 20 wt % and preferably 1 to 15 mass %.

Also, a weight average molecular weight measured by GPC is 2,000 to 50,000, and preferably 2,000 to 20,000 and more preferably 4,000 to 15,000 as a dispersing agent. A ratio between a weight average molecular weight and a number average molecular weight measured by GPC is 1.0 to 2.0, and preferably 1.0 to 1.5 particularly as a dispersing agent.

(2) Method for Producing Copolymer

A method for producing the block copolymer of the present invention is not particularly limited, and it may be produced by a known method, for example, by polymerizing monomers through living polymerization for obtaining a block copolymer. The living polymerization may be living radical polymerization or living anionic polymerization, between which the living anionic polymerization is preferred.

For obtaining the block copolymer, monomers of the block chain (A) or (B) may be polymerized and the resultant may be successively polymerized with monomers of the other block into a block copolymer, or alternatively, monomers of the block chain (A) and the block chain (B) may be individually reacted to prepare blocks and the blocks may be combined thereafter. The living anionic polymerization is preferably employed because a composition and a molecular weight may be strictly controlled in this method.

In producing a block copolymer by the living anionic polymerization, the polymerization may be performed, for example, by adding a desired monomer dropwise to a solvent including an additive and a polymerization initiator. Here, in order to obtain a block polymer with a desired sequence, a reaction is caused by successively adding monomers of the respective blocks dropwise so as to attain a desired sequence.

In order to polymerize monomers of a given block and subsequently polymerize monomers of a next block, after completing the polymerization reaction of the former block, the monomers of the next block are started to add dropwise. Progress of a polymerization reaction may be checked by detecting a remaining amount of the monomers through gas chromatography or liquid chromatography. Furthermore, after completing the dropwise addition of the monomers of the former block, the resultant may be stirred for 1 minute to 1 hour, depending upon the types of monomers and solvent, before starting the dropwise addition of the monomers of the next block.

When a plurality of kinds of monomers are included in each block, these monomers may be individually or simultaneously added dropwise.

When the living anionic polymerization is employed for producing the copolymer, active hydrogen of a monomer having an acidic group is preferably protected. A repeating unit having an acidic group can be obtained by polymerizing a monomer having an acidic group protected by a protecting group and then deprotecting the protecting group.

Here, the protecting group is not particularly limited as far as it is a group known to be used as a protecting group for an acidic group in this technical field.

Examples of a protecting group for a carboxyl group include a t-butyl group, a benzyl group, a methoxymethyl group and an ethoxyethyl group.

Examples of a protecting group for a hydroxyl group include a methoxymethyl group, a 2-methoxyethoxymethyl group, a bis(2-chloroethoxy)methyl group, a tetrahydropyranyl group, a 4-methoxytetrahydropyranyl group, a tetrahydrofuranyl group, a triphenylmethyl group, a trimethylsilyl group, a 2-(trimethylsilyl)ethoxymethyl group, a t-butyldimethylsilyl group, a trimethylsilylmethyl group, a t-butyl group, a t-butoxycarbonyl group, a t-butoxycarbonylmethyl group, and a 2-methyl-2-t-butoxycarbonylmethyl group.

It is generally difficult to polymerize a monomer having a quaternary ammonium salt group through the living anionic polymerization. Accordingly, in the case where a polymer comprising the repeating unit having a quaternary ammonium salt group is produced by the living anionic polymerization, a monomer used as a material for a repeating unit having a tertiary amino group is polymerized, and then the tertiary amino group may be quaternized by a known method. Examples of a quaternizing agent include general alkylating agents of alkyl halides such as benzyl chloride, benzyl bromide, benzyl iodide, methyl chloride, ethyl chloride, methyl bromide and methyl iodide, and dimethyl sulfate, diethyl sulfate, di-n-propyl sulfate and the like.

In the case where the living radical polymerization is employed for producing the copolymer, the reaction may be carried out in the same manner as in employing the living anionic polymerization, or after polymerizing monomers of a given block, the resultant polymer is purified once before polymerizing a next monomer, so that the next monomer may be polymerized after removing a residue of the monomer remaining after the former reaction. In the case where it is preferred that the monomers of the respective blocks are not mixed with each other, the polymer is preferably purified.

An anionic polymerization initiator used in the polymerization of monomers is not particularly limited as far as it is a nucleophilic agent having a function to start polymerization of an anionic polymerizable monomer, and for example, an alkali metal, an organic alkali metal compound, lithium amide or other anionic initiators for methacrylate known in the art may be used.

Examples of the alkali metal include lithium, sodium, potassium and cesium. Examples of the organic alkali metal compound include alkylated substances, allylated substances and arylated substances of the aforementioned alkali metals, among which alkyllithium is particularly preferred. Specifically, ethyllithium, n-butyllithium, sec-butyllithium, t-butyllithium, ethylsodium, lithiumbiphenyl, lithiumnaphthalene, lithiumtriphenyl, sodiumnaphthalene, potassiumnaphthalene, α-methylstyrenesodium dianion, 1,1-diphenylhexyllithium, 1,1-diphenyl-3-methylpentyllithium, 1,4-dilithio-2-butene, 1,6-dilithiohexane, polystyryllithium, cumylpotassium, cumylcesium or the like may be used. Lithium diethylamide, lithium diisopropylamide or the like can be used as the lithium amide. α-lithioisobutyrate such as methyl α-lithioisobutyrate, or the like can be used as other anionic initiators for methacrylate known in the art. These anionic polymerization initiators may be singly used or a mixture of two or more of them may be used.

A usage of the anionic polymerization initiator is generally 0.0001 to 0.2 equivalent and preferably 0.0005 to 0.1 equivalent based on the entire amount of anionic polymerizable monomers to be used. When an anionic polymerization initiator is used in an amount of this range, a desired polymer may be produced in high yield.

A polymerization temperature employed in the present invention is not particularly limited as far as it falls within a temperature range where a side reaction of a transfer reaction or a termination reaction may be avoided and monomers may be consumed to complete the polymerization, and the polymerization is preferably carried out in a temperature range of −100° C. or higher and a boiling point of a solvent or lower. Furthermore, a concentration of monomers in a polymerization solvent is not particularly limited, and is generally 1 to 40 wt % and preferably 10 to 30 wt %.

The polymerization solvent used in the production method of the present invention is not particularly limited as far as it is not involved in the polymerization reaction and is compatible with polymers, and specific examples include polar solvents of ether-based compounds such as diethyl ether, tetrahydrofuran (THF), dioxane and trioxane, and tertiary amines such as tetramethylethylene diamine and hexamethylphosphoric triamide; and non-polar solvents or low-polar solvents of aliphatic, aromatics or alicyclic hydrocarbon compounds such as hexane and toluene. These solvents may be singly used or a mixture of two or more of them may be used as a mixed solvent. In the production method of the present invention, even when a non-polar solvent or a low-polar solvent is used together with a polar solvent, the polymerization may be accurately controlled, and for example, a non-polar solvent or a low-polar solvent may be used in a ratio of 5 vol % or more, 20 vol % or more, or 50 vol % or more based on the entire amount of the solvent.

In the present invention, dialkyl zinc such as diethyl zinc, dialkyl magnesium such as dibutyl magnesium, or an organic metal such as triethyl aluminum may be used as a polymerization stabilizer or a purifying agent for a monomer or a solvent if necessary.

In the present invention, an additive such as an alkali metal salt or an alkaline earth metal salt may be added at the start of or during the polymerization if necessary. Examples of such an additive include mineral acid salts or halides such as sulfates, nitrates, and borates of sodium, potassium, barium and magnesium, and more specifically, examples are chlorides, bromides and iodides of lithium or barium, lithium borate, magnesium nitrate, sodium chloride and potassium chloride. Among these additives, halides of lithium such as lithium chloride, lithium bromide, lithium iodide and lithium fluoride are preferred, and lithium chloride is particularly preferred.

(3) Use of Copolymer of the Invention

The copolymer of the present invention is very useful for dispersing a pigment in coating, printing ink, inkjet ink and a pigment dispersion for a color filter and the like.

EXAMPLES

The present invention will now be described in detail by way of Examples, which do not limit the technical scope of the invention.

Example 1

Polymerization Process

A reaction vessel was charged with 55.7 parts of tetrahydrofuran (hereinafter sometimes abbreviated as THF), 4.65 parts of lithium chloride (a THF solution with a concentration of 4.54 wt %) and 0.45 parts of diphenylethylene, and the resultant was cooled to −60° C. Thereafter, 1.22 parts of n-butyllithium (a hexane solution with a concentration of 15.36 wt %) was added thereto, and the resultant was aged for 10 minutes.

Next, a mixed solution of 1.66 parts of 1-ethoxyethyl methacrylate (hereinafter sometimes abbreviated as EEMA), 9.9 parts of n-butyl methacrylate (hereinafter sometimes abbreviated as nBMA), and 4.14 parts of methyl methacrylate (hereinafter sometimes abbreviated as MMA) was added dropwise thereto over 120 minutes, and the reaction was continued for 15 minutes after the dropwise addition. Then, the resultant was subjected to gas chromatography (hereinafter abbreviated as GC) so as to confirm disappearance of the monomers.

Next, 3.96 parts of 2-(dimethylamino)ethyl methacrylate (hereinafter sometimes abbreviated as DMMA) was added dropwise thereto, and the reaction was continued for 30 minutes after the dropwise addition. Then, the resultant was subjected to GC, and after thus confirming disappearance of the monomer, 0.41 parts of methanol was added thereto to terminate the reaction.

The thus obtained copolymer was analyzed by gel permeation chromatography (hereinafter abbreviated as GPC) (mobile phase: DMF, poly(methyl methacrylate) (hereinafter, sometimes abbreviated as PMMA) standard), whereby confirming that it is a copolymer having a molecular weight (Mw) of 12,220, a molecular weight distribution (Mw/Mn) of 1.46 and a composition ratio of DMMA-[nBMA/MMA/EEMA]=21-[48/22/9] wt %.

(Deprotection Process)

16.44 parts of water was added into 65.64 parts of a propylene glycol monomethyl ether acetate (hereinafter sometimes abbreviated as PGMEA) solution of the thus obtained precursor polymer with a concentration of 25 wt %, and the resultant was heated to 100° C. for reacting for 8 hours. Water was distilled off to prepare a PGMEA solution with a concentration of 40 wt %.

The thus obtained copolymer was analyzed by the GPC (mobile phase: DMF, PMMA standard), whereby confirming that it is a copolymer having a molecular weight (Mw) of 12,720, a molecular weight distribution (Mw/Mn) of 1.46 and a composition ratio of DMMA-[nBMA/MMA/MA]=22-[50/23/5] wt % (wherein MA represents methacrylic acid).

Example 2

Polymerization Process

A reaction vessel was charged with 600.30 parts of THF, 10.80 parts of lithium chloride (a THF solution with a concentration of 3.63 wt %) and 3.84 parts of diphenylethylene, and the resultant was cooled to −60° C. Thereafter, 9.60 parts of n-butyllithium (a hexane solution with a concentration of 15.36 wt %) was added thereto, and the resultant was aged for 10 minutes.

Next, a mixed solution of 103.84 parts of nBMA and 13.45 parts of EEMA was added dropwise thereto over 30 minutes, and the reaction was continued for 15 minutes after the dropwise addition. Then, the resultant was subjected to the GC so as to confirm disappearance of the monomers. A part of the reaction solution was sampled for the GPC analysis (mobile phase: DMF, PMMA standard), and the molecular weight (Mw) was 2,910 and the molecular weight distribution (Mw/Mn) was 1.03.

Next, 32.25 parts of DMMA was added dropwise thereto, and the reaction was continued for 30 minutes after the dropwise addition. Then, the resultant was subjected to the GC, and after thus confirming disappearance of the monomer, 3.42 parts of methanol was added thereto to terminate the reaction.

The thus obtained copolymer was analyzed by the GPC (mobile phase: DMF, PMMA standard), and the molecular weight (Mw) was 4,010 and the molecular weight distribution (Mw/Mn) was 1.07.

(Deprotection Process)

Two hundred twenty parts of a PGMEA solution of the thus obtained copolymer with a concentration of 50 wt % was heated to 160° C. for aging for 3 hours. Thereafter, a PGMEA solution with a concentration of 40 mass % was prepared from the resultant.

The thus obtained copolymer was analyzed by the GPC (mobile phase: DMF, PMMA standard, column switched), whereby confirming that it is a copolymer having a molecular weight (Mw) of 12,040, a molecular weight distribution (Mw/Mn) of 1.24 and a composition ratio of DMMA-[nBMA/MA]=22-[73/5] wt %.

Comparative Example 1

A reaction vessel was charged with 568.08 parts of THF, 11.56 parts of lithium chloride (a THF solution with a concentration of 3.63 wt %) and 3.25 parts of diphenylethylene, and the resultant was cooled to −60° C. Thereafter, 7.16 g of n-butyllithium (a hexane solution with a concentration of 15.36 wt %) was added thereto, and the resultant was aged for 10 minutes.

Next, a mixed solution of 33.72 parts of MMA, 15.52 parts of nBMA, 13.14 parts of benzyl methacrylate (hereinafter sometimes abbreviated as BzMA), 15.79 parts of ethylhexyl methacrylate (hereinafter sometimes abbreviated as EHMA) and 11.94 parts of methoxypolyethylene glycol monomethacrylate (PME-200 manufactured by NOF Corporation) (hereinafter sometimes abbreviated as PEGMA) was added dropwise thereto over 30 minutes, and the reaction was continued for 15 minutes after the dropwise addition. Then, disappearance of the monomers was confirmed by the GC measurement. A part of the reaction solution was sampled for the GPC analysis (mobile phase: DMF, PMMA standard), and the molecular weight (Mw) was 5,590 and the molecular weight distribution (Mw/Mn) was 1.07.

Next, 30.09 parts of DMMA was added dropwise thereto, and the reaction was continued for 30 minutes after the dropwise addition. Then, the resultant was subjected to the GC, and after thus confirming disappearance of the monomer, 2.52 parts of methanol was added thereto to terminate the reaction. Thereafter, the resultant was subjected to distillation under reduced pressure to prepare a PGMEA solution with a concentration of 40 wt %.

The thus obtained copolymer was analyzed by the GPC (mobile phase: DMF, PMMA standard), whereby confirming that it is a copolymer having a molecular weight (Mw) of 7,110, a molecular weight distribution of (Mw/Mn) 1.08 and a composition ratio of DMMA-[MMA/nBMA/BzMA/EHMA/PEGMA]=25-[28/13/11/13/10] wt %.

Comparative Example 2

Polymerization Process

A reaction vessel was charged with 626.56 parts of THF, 10.26 parts of lithium chloride (a THF solution with a concentration of 3.63 wt %), and 3.23 parts of diphenylethylene, and the resultant was cooled to −60° C. Thereafter, 6.95 parts of n-butyllithium (a hexane solution with a concentration of 15.36 wt %) was added thereto, and the resultant was aged for 10 minutes.

Next, a mixed solution of 26.52 parts of MMA and 62.13 parts of nBMA was added dropwise thereto over 30 minutes, and the reaction was continued for 15 minutes after the dropwise addition. Then, disappearance of the monomers was confirmed by the GC measurement. A part of the reaction solution was sampled for the GPC analysis (mobile phase: DMF, PMMA standard), and the molecular weight (Mw) was 3,840 and the molecular weight distribution (Mw/Mn) was 1.04.

Next, 42.19 parts of DMMA was added dropwise thereto, and the reaction was continued for 30 minutes after the dropwise addition. Then, after confirming disappearance of the monomers by the GC measurement, 3.79 parts of methanol was added thereto to terminate the reaction. Thereafter, the resultant was subjected to distillation under reduced pressure to prepare a PGMEA solution with a concentration of 40 wt %.

The thus obtained copolymer was analyzed by the GPC (mobile phase: DMF, PMMA standard), whereby confirming that it is a copolymer having a molecular weight (Mw) of 5,770, a molecular weight distribution (Mw/Mn) of 1.08 and a composition ratio of DMMA-[MMA/nBMA]=32–[20/48] wt %.

Comparative Example 3

A flask equipped with a stirrer was charged with 30 parts of PGMEA, and the resultant was heated to 80° C. while nitrogen gas was injected thereto. A solution containing 1.4 parts of MA, 12.6 parts of nBMA, 5.6 parts of EHMA and 8.4 parts of DMMA dissolved in 16 parts of PGMEA and a solution containing 1.2 parts of 2,2'-azobisisobutyronitrile dissolved in 10 parts of PGMEA were simultaneously added dropwise thereto over 2 hours at the same temperature. Thereafter, the temperature of the reaction solution was raised to 100° C., and this temperature was kept for 1 hour for polymerization. Thereafter, the resultant was subjected to distillation under reduced pressure to prepare a PGMEA solution with a concentration of 40 mass %. In this way, a random copolymer of MA, nBMA, EHMA, and DMMA was obtained.

(Preparation of Pigment Dispersion

The copolymer solutions obtained in Examples 1 to 2 and Comparative Examples 1 to 3 were each used as pigment dispersing agents for preparing pigment dispersions as follows.

A pigment dispersion was prepared by mixing and dispersing, for 12 hours with a bead mill, 15 parts of a 70/30 mixture of C. I. Pigment Green 36 and C. I. Pigment Yellow 150 used as pigments, 10 parts of the solution of any one of the copolymers obtained in Examples 1 to 2 and Comparative Examples 1 to 3 used as the pigment dispersing agent, 55 parts of PGMEA and 20 parts of diethylene glycol methylethyl ether used as solvents.

As a result, the pigment dispersions prepared by using the copolymers obtained in Examples 1 to 2 showed a color of brilliant green, and even after they were kept at 40° C. for one week, they exhibited viscosity values equivalent to those attained immediately after the preparation. On the other hand, although the pigment dispersion prepared by using the copolymer obtained in Comparative Examples 1 to 2 showed a color of brilliant green, after it was kept at 40° C. for one week, its viscosity value was increased by 20% as compared with that attained immediately after the preparation. Although the pigment dispersion prepared by using the copolymer obtained in Comparative Example 3 showed a color of brilliant green, after it was kept at 40° C. for 1 week, its viscosity value was increased by 30% as compared with that attained immediately after the preparation.

INDUSTRIAL APPLICABILITY

The copolymer of the present invention is good in pigment dispersibility, and may be used as, for example, a pigment dispersing agent for manufacturing an optical color filter.

The invention claimed is:

1. A copolymer, consisting essentially of:
a block chain (A) consisting essentially of at least one repeating unit selected from the group consisting of a repeating unit having a tertiary amino group represented by formula (II):

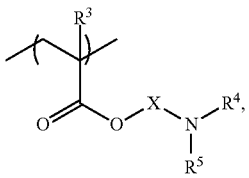

(II)

wherein:
$R^3$ represents a hydrogen atom or a C1-C3 alkyl group;
$R^4$ and $R^5$ each independently represents a C1-C6 alkyl group or a C6-C10 aryl C1-C6 alkyl group; and
X represents a C1-C10 alkylene group or a C1-C10 alkylene-O—C1-C10 alkylene group; and
a repeating unit having a quaternary ammonium salt group represented by formula (VII):

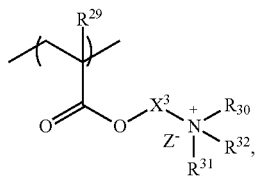

(VII)

wherein:
$R^{29}$ represents a hydrogen atom or a C1-C3 alkyl group;
$X^3$ represents a C1-C10 alkylene group or a C1-C10 alkylene-O—C1-C10 alkylene group;
$R^{30}$, $R^{31}$, and $R^{32}$ each independently represents a C1-C6 alkyl group or a C6-C10 aryl C1-C6 alkyl group; and
$Z^-$ represents a counter ion; and
a block chain (B) comprising:
a repeating unit having an acidic group represented by formula (III):

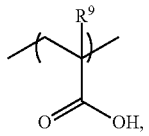

(III)

wherein R⁹ represents a hydrogen atom or a C1-C3 alkyl group, or
a repeating unit represented by formula (IV):

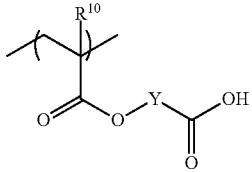

(IV)

wherein:
R¹⁰ represents a hydrogen atom or a C1-C3 alkyl group; and
Y represents a C1-C10 alkylene group or a C1-C10 alkylene-O—C1-C10 alkylene group; and
a repeating unit represented by the following formula (I):

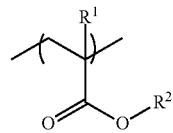

(I)

wherein:
R¹ represents a hydrogen atom or a C1-C3 alkyl group; and
R² represents an aliphatic hydrocarbon group or an alicyclic hydrocarbon group;
wherein:
the repeating unit represented by formula (I) has a copolymerization ratio of 90 wt % or more in the block chain (B); and
a ratio between the block chain (A) and the block chain (B) in the copolymer is 15 to 35:85 to 65 in a wt % ratio.

* * * * *